US012347924B2

(12) United States Patent
Kang et al.

(10) Patent No.: US 12,347,924 B2
(45) **Date of Patent: *Jul. 1, 2025**

(54) ANTENNA APPARATUS FOR BASE STATION AND ADAPTER THEREOF

(71) Applicant: KMW INC., Hwaseong-si (KR)

(72) Inventors: Seong Man Kang, Hwaseong-si (KR); Dae Myung Park, Hwaseong-si (KR); Hyoung Seok Yang, Hwaseong-si (KR); In Ho Kim, Yongin-si (KR); Kwang Seok Choi, Gumi-si (KR)

(73) Assignee: KMW INC., Hwaseong-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,431

(22) Filed: Mar. 13, 2024

(65) Prior Publication Data

US 2024/0222851 A1 Jul. 4, 2024

Related U.S. Application Data

(63) Continuation of application No. 17/159,173, filed on Jan. 27, 2021, now Pat. No. 11,962,073, which is a (Continued)

(30) Foreign Application Priority Data

Jul. 27, 2018 (KR) ........................ 10-2018-0088114
Jul. 26, 2019 (KR) ........................ 10-2019-0090815

(51) Int. Cl.

| | |
|---|---|
| *H01Q 1/24* | (2006.01) |
| *H01R 13/639* | (2006.01) |
| *H01R 24/54* | (2011.01) |

(52) U.S. Cl.

CPC ........... *H01Q 1/246* (2013.01); *H01R 13/639* (2013.01); *H01R 24/542* (2013.01); *H01R 2201/02* (2013.01)

(58) Field of Classification Search

CPC ........ H01Q 1/1228; H01Q 1/24; H01Q 1/246; H01R 13/639; H01R 2201/02; H01R 24/54; H01R 24/542

See application file for complete search history.

(56) References Cited

U.S. PATENT DOCUMENTS

| | | | |
|---|---|---|---|
| 7,084,834 | B1 | 8/2006 | Hopkins |
| 11,289,798 | B2 | 3/2022 | Kaistha |

(Continued)

FOREIGN PATENT DOCUMENTS

| | | | |
|---|---|---|---|
| CN | 201364948 Y | 12/2009 | |
| EP | 3217475 A1 | 9/2017 | |

(Continued)

OTHER PUBLICATIONS

International Search Report for PCT/KR2019/009332, mailed Oct. 31, 2019 and its English translation.

(Continued)

*Primary Examiner* — Thien M Le

(74) *Attorney, Agent, or Firm* — Insight Law Group, PLLC; Seung Lee

(57) ABSTRACT

The present disclosure relates to an antenna apparatus for a base station and an adapter thereof and particularly comprises: an antenna module vertically installed to be spaced forward from a support pole by a predetermined distance so as to have a distancing space therebetween; an RRH installed on the antenna module to be positioned in the distancing space, wherein one of the upper end and the lower end thereof is hinge-coupled to the antenna module and the other of the upper end and the lower end thereof is attached to or detached from a part of the antenna module to enable electrical signal connection or disconnection while being rotated around the hinge; and an adapter for mediating the electrical signal connection and disconnection between the antenna module and the RRH. Therefore, the present dis- (Continued)

closure provides advantages of reducing installation time and installation costs.

19 Claims, 16 Drawing Sheets

Related U.S. Application Data continuation of application No. PCT/KR2019/009332, filed on Jul. 26, 2019.

(56) References Cited

U.S. PATENT DOCUMENTS

| | | | | |
|---|---|---|---|---|
| 11,575,217 | B2 | 2/2023 | Patel et al. | |
| 11,962,073 | B2 * | 4/2024 | Kang | H01R 13/639 |
| 2003/0221118 | A1 * | 11/2003 | Walker | G06Q 99/00 713/193 |
| 2006/0287783 | A1 * | 12/2006 | Walker | H04Q 9/00 701/31.4 |
| 2012/0106912 | A1 * | 5/2012 | McGranahan | G02B 6/477 385/135 |
| 2014/0179244 | A1 | 6/2014 | Colapietro et al. | |
| 2015/0380806 | A1 | 12/2015 | Wild | |
| 2016/0099745 | A1 | 4/2016 | Ho et al. | |
| 2016/0352042 | A1 | 12/2016 | Wankoff et al. | |
| 2017/0062911 | A1 | 3/2017 | Butler et al. | |
| 2017/0106304 | A1 * | 4/2017 | Thompson | A63H 29/22 |
| 2017/0149115 | A1 | 5/2017 | Sierzenga et al. | |
| 2018/0231177 | A1 * | 8/2018 | Tuovila | H01Q 1/1228 |
| 2020/0183731 | A1 * | 6/2020 | Dornemann | G06F 11/1461 |
| 2020/0350661 | A1 * | 11/2020 | Alrutz | H01Q 21/205 |
| 2021/0151865 | A1 * | 5/2021 | Kang | H01R 24/542 |
| 2023/0253695 | A1 * | 8/2023 | Kim | H01Q 21/245 |

FOREIGN PATENT DOCUMENTS

| | | | |
|---|---|---|---|
| JP | 2017-537535 | A | 12/2017 |
| KR | 10-2015-0083463 | A | 7/2015 |
| KR | 10-2016-0052311 | A | 5/2016 |

OTHER PUBLICATIONS

Japanese office action mailed Feb. 1, 2022 for Japanese Application No. 2021-504338.

Extended European search report mailed Apr. 5, 2022 for European Application No. 19841167.0.

Non-final Office Action mailed Dec. 19, 2022 from the Korean Intellectual Property Office for Korean Application No. 10-2019-0090815.

Non-final Office Action mailed Aug. 15, 2023 for U.S. Appl. No. 17/159,173.

Notice of Allowance mailed Dec. 11, 2023 for U.S. Appl. No. 17/159,173.

* cited by examiner

ANTENNA APPARATUS FOR BASE STATION AND ADAPTER THEREOF

CROSS-REFERENCE TO RELATED APPLICATIONS

This application is a Continuation of U.S. application Ser. No. 17/159,173, filed on Jan. 27, 2021 (now pending), which is a Continuation of International Application No. PCT/KR2019/009332, filed on Jul. 26, 2019, which claims the benefit of and priority to Korean Patent Application Nos. 10-2018-0088114, filed on Jul. 27, 2018 and 10-2019-0090815, filed on Jul. 26, 2019, the content of which are herein incorporated by reference in their entirety.

TECHNICAL FIELD

The present disclosure relates to an antenna apparatus for a base station and an adapter therefor, and more particularly, to an antenna apparatus for a base station which may be easily assembled and installed and an adapter therefor.

BACKGROUND ART

In a mobile communication system, a "base station" refers to a system that relays a radio wave of a mobile terminal within a cell. The base station is chiefly installed at the rooftop of a building, etc. and relays a radio wave of a mobile terminal. Accordingly, a base station is present in a cell unit. Such a base station controls the transmission of outgoing and incoming signals, the designation of a communication channel, the monitoring of a communication channel, etc. in a cell unit in addition to an interface function between a mobile terminal and an exchange office. A control antenna capable of beam tilting vertically or horizontally has been supplied as an antenna apparatus adopted for the base station due to its many advantages.

As mobile communication services are popularized, the supply of an antenna apparatus that provides a wireless network environment in which services can be more stably provided is enlarged. Recently, fifth generation (5G) for mobile communication services tends to be settled via 3G and 4G and pre-5G from 2G that enables only a wired call. The antenna apparatus for such 5G mobile communication may be mounted along with the existing 4G and pre-5G, and an installation location thereof may be shared.

However, a conventional antenna apparatus for a base station has a problem in that an installation time and installation cost are great because an antenna module and a remote radio head (RRH) have different specifications, which makes it very difficult to connect and assemble an antenna and an RRH for each frequency band, which are provided in an antenna module.

DISCLOSURE

Technical Problem

The present disclosure has been made to solve the above problems, and an object of the present disclosure is to provide an antenna apparatus for a base station and an adapter therefor, which minimize an installation time and installation cost for the antenna apparatus for a base station and which are also convenient for maintenance by minimizing and sharing parts used to install an antenna module and an RRH in a support pole.

Furthermore, another object of the present disclosure is to provide an antenna apparatus for a base station, which is designed to minimize an installation space for the antenna apparatus for a base station mounted on a support pole and also facilitate the connection and coupling of an antenna module and an RRH even within a reduced installation space, and an adapter therefor.

Furthermore, still another object of the present disclosure is to provide an antenna apparatus for a base station, which can improve stability by preventing a connection portion of an adapter that mediates the connection of an RRH to an antenna module from being randomly detached, and an adapter therefor.

A technical object of the present disclosure is not limited to the aforementioned technical objects, and other technical objects not described above may be evidently understood by those skilled in the art from the following description.

Technical Solution

An embodiment of an antenna apparatus for a base station according to the present disclosure includes an antenna module installed in a way to have spacing at the front of a support pole by a given distance, an RRH installed in the antenna module in a way to be located in the spacing, wherein any one of the top and bottom of the RRH is hinged and coupled to the antenna module, and the other of the top and the bottom of the RRH is rotated around the hinge and attached to or detached from part of the antenna module in a way to enable electrical signal connection and disconnection, and an adapter configured to mediate the electrical signal connection and disconnection of the antenna module and the RRH.

In this case, the adapter may include an integrated connection part provided at a side end part of the adapter in a way to be connected to the antenna module, and a branch connection part provided at the top of the adapter in a way to be connected to the RRH, wherein the integrated connection part may be further equipped with a locking part for preventing separation from the antenna module.

Furthermore, the branch connection part may be provided as the number corresponding to the number of ports provided in the RRH, and the integrated connection part may be provided as the least common multiple of the number of branch connection parts.

Furthermore, the branch connection part and the integrated connection part may include connecting structures, and the connecting structures may include DCC connectors.

Furthermore, the locking part may include a locking lever provided at the side end part of the adapter in a way to be hinged and rotated, and a locking rod provided to move in a straight line in conjunction with the locking lever, wherein a front end part of the locking rod is inserted and caught in an antenna-side connection part side of the antenna module.

Furthermore, at least one rod sealing for waterproof purposes may be disposed on an outer circumference surface of the locking rod.

Furthermore, the antenna module may be equipped with a hinge fixing part in a form of a hinge hole penetrated left and right, the RRH may be equipped with a hinge coupling pole inserted into the hinge fixing part, and the bottom of the RRH may be rotated around the hinge coupling pole in the state in which the hinge coupling pole is inserted and fastened to the hinge fixing part.

Furthermore, multiple bearing balls to reduce a friction force with the hinge coupling pole may be disposed within a hinge hole of the hinge fixing part.

Furthermore, when the bottom of the RRH approaches the antenna module and rotates, the integrated connection part of the adapter may be inserted and connected to the antenna-side connection part provided in the antenna module.

Furthermore, a single integrated connection part may be provided in a way to be connected to a single antenna-side connection part provided in the antenna module.

Furthermore, two integrated connection parts may be provided in a way to be connected to a first antenna-side connection part and a second antenna-side connection part disposed on the left and right of the antenna module, respectively.

Furthermore, at least one sealing pad for waterproof purposes may be interposed between the single antenna-side connection part or the first antenna connection part and the second antenna connection part and the integrated connection part.

An adapter for an antenna apparatus for a base station according to the present disclosure may include a mounting panel, an integrated connection part provided at a side end part of the mounting panel and provided to be connected to an antenna module installed in a way to have spacing at the front of a support pole by a given distance, a branch connection part provided at the top of the mounting panel and provided to be connected to an RRH installed in the antenna module in a way to be located in the spacing, wherein any one of the top and bottom of the RRH is hinged and coupled to the antenna module, and the other of the top and the bottom of the RRH is rotated around the hinge and attached to or detached from part of the antenna module in a way to enable electrical signal connection and disconnection, and a locking part configured to prevent separation from the antenna module.

Advantageous Effects

According to an embodiment of the antenna apparatus for a base station according to the present disclosure, the following various effects can be achieved.

First, there is an effect in that an installation time and installation cost for the antenna module and the RRH can be minimized.

Second, there is an effect in that space utilization can be enhanced because an antenna module and the RRH can be easily connected and coupled within a reduced installation space.

Third, there is an effect in that instability for separation according to random detachment can be solved because a connection portion of the antenna module and the RRH maintains a strong connection force.

<Description of reference numerals>

Figure 1:
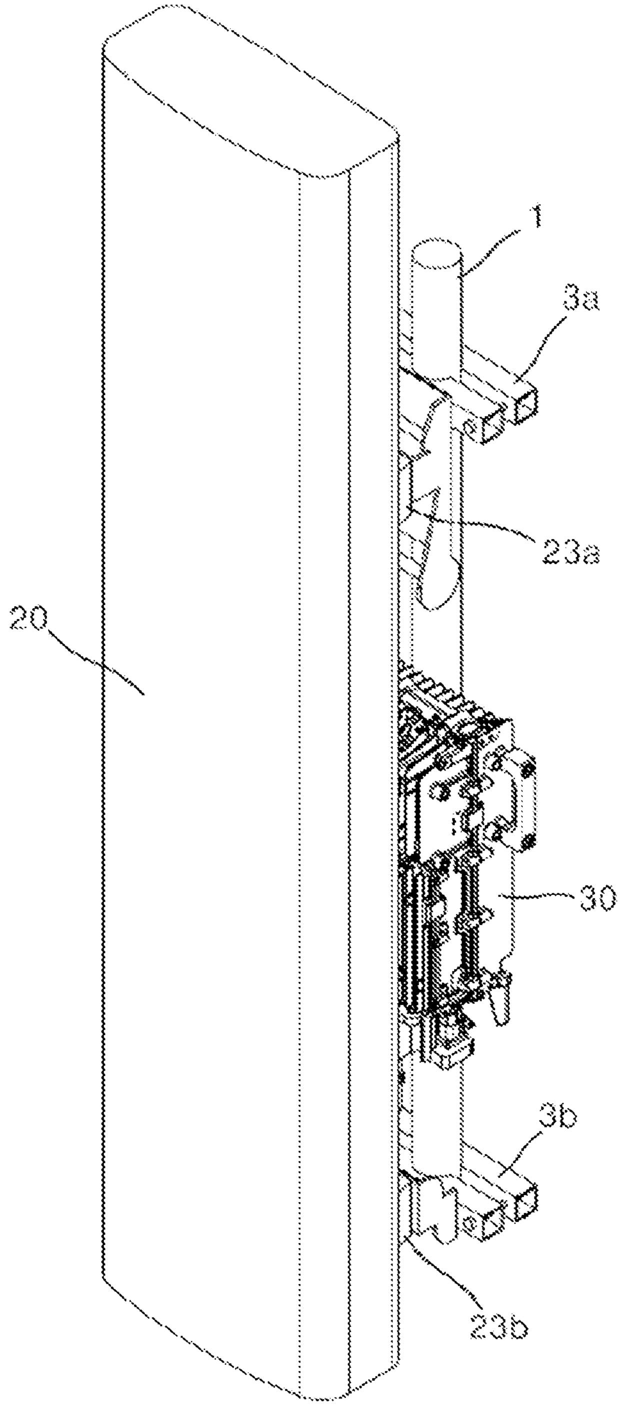
FIG. 1 is a perspective view illustrating a first embodiment of an antenna apparatus for a base station according to the present disclosure.

| | |
|---|---|
| 1: support pole | 3a: upper antenna coupling bracket |
| 3b: lower antenna coupling bracket | 20: antenna module |
| 25: antenna-side connection part | 25a: edge rib |
| 25b: first sealing pad | 25c: second sealing pad |
| 25d: external sealing | 26: hinge fixing part |
| 27: open slit | 28: bearing ball |
| 30: RRH | 39: port |
| 100: adapter according to first embodiment | 110: mounting panel |
| 120: integrated connection part | 121: protruding block |
| 122: assembly short jaw | 123: connection short jaw |
| 125: connecting structure | 127: lever accommodation groove |
| 130: branch connection part | 135: connecting structure |
| 140: locking part | 140a, 140b: rod sealing |
| 141: locking lever | 142: locking rod |
| 200: adapter according to second embodiment | |

MODE FOR INVENTION

Hereinafter, embodiments of an antenna apparatus for a base station and an adapter therefor according to the present disclosure are described in detail with reference to the accompanying drawings.

It is to be noted that in assigning reference numerals to elements in the drawings, the same elements have the same reference numerals even in cases where the elements are shown in different drawings. Furthermore, in describing the embodiments of the present disclosure, a detailed description of the known elements or functions will be omitted if it is determined that the detailed description hinders understanding of the embodiments of the present disclosure.

In describing the elements of the embodiments of the present disclosure, terms, such as a first, a second, A, B, (a), and (b), may be used. However, although the terms are used only to distinguish one element from the other element, the essence, order, or sequence of the elements is not limited by the terms. Furthermore, all terms used herein, including technical terms or scientific terms, have the same meanings as those commonly understood by a person having ordinary skill in the art to which the present disclosure pertains, unless defined otherwise in the specification. Terms, such as those commonly used and defined in dictionaries, should be construed as having the same meanings as those in the context of a related technology, and should not be construed as having ideal or excessively formal meanings unless explicitly defined otherwise in the specification.

Figure 2:
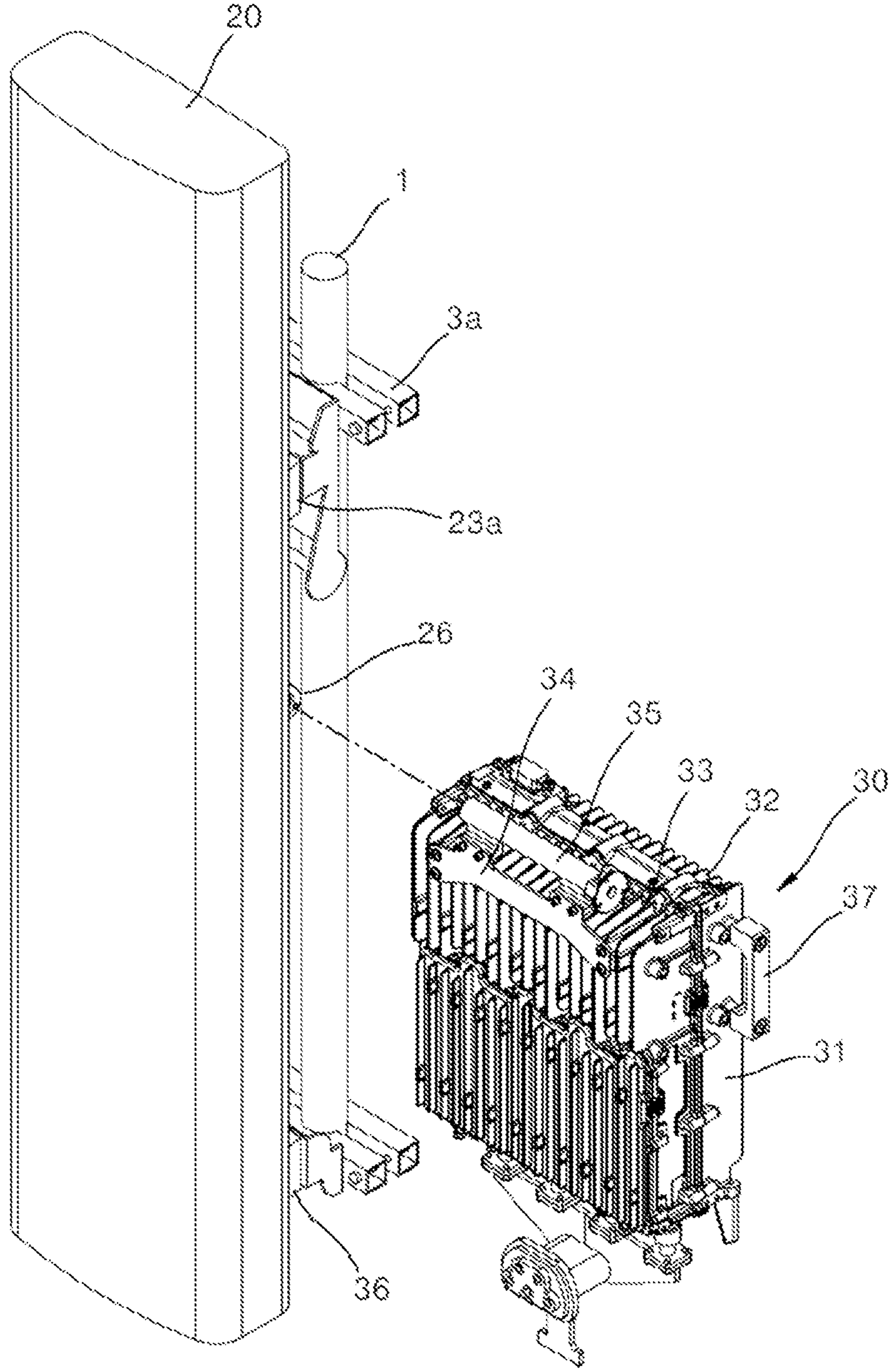
FIG. 2 is an exploded perspective view illustrating a form in which an RRH has been installed in an antenna module installed in a support pole.
Figure 3:
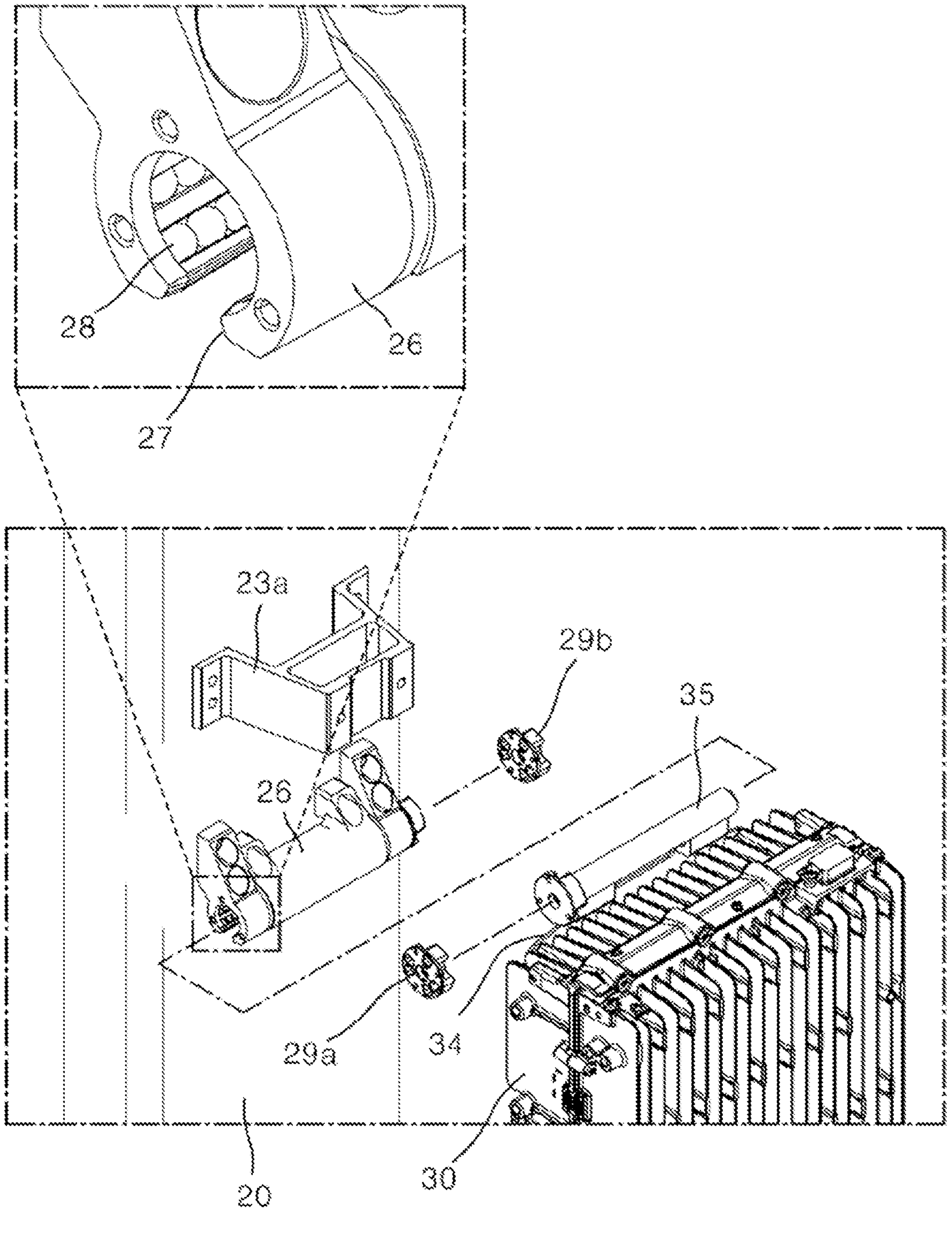
FIG. 3 is an exploded perspective view of FIG. 2.

FIG. 1 is a perspective view illustrating a first embodiment of an antenna apparatus for a base station according to the present disclosure. FIG. 2 is an exploded perspective view illustrating a form in which an RRH has been installed in an antenna module installed in a support pole. FIG. 3 is an exploded perspective view of FIG. 2.

First, in order to help understanding of the antenna apparatus for a base station according to the present disclosure, a configuration of the antenna apparatus for a base station is described in detail. An antenna module 20 described in the present embodiment is a concept denoting all antenna modules each having at least one frequency band. Furthermore, a relay described in the present embodiment is a remote radio head (hereinafter referred to as an "RRH") 30, and refers to an apparatus which is connected to an antenna for each frequency band provided to the antenna module 20 and which transmits and receives signals to and from the antenna and a base station. The RRH 30 refers to a relay device that receives, amplifies or retransmits a weakened signal or standardizes a distorted waveform and adjusts timing again between a base station of a mobile communication system and a mobile communication terminal.

As illustrated in FIG. 1, in embodiments of the antenna apparatus for a base station according to the present disclosure, the antenna module 20 and the RRH 30 may be simultaneously installed in a support pole 1. More specifically, the antenna module 20 may be coupled to the front side of the support pole 1 through the medium of an upper antenna coupling bracket 3*a* and a lower antenna coupling bracket 3*b* previously coupled to the support pole 1 up and down. An upper coupling stage 23*a* and a lower coupling stage 23*b* to be coupled to the upper antenna coupling bracket 3*a* and the lower antenna coupling bracket 3*b* provided in the support pole 1, respectively, may be provided at the rear part of the antenna module 20. At least one of the upper antenna coupling bracket 3*a* and the lower antenna coupling bracket 3*b* coupled to the support pole 1 may be provided in the form of a rotating bracket that tilts and forward rotates a hinge coupling location at the top or bottom of the antenna module 20 by a given angle with respect to the support pole 1. Accordingly, the directivity of an antenna beam can be easily adjusted because the antenna module 20 can be tilted and rotated up and down.

In this case, the antenna module 20 is provided in the form of a box that is long and slim up and down, and may be installed in parallel to the support pole 1 in a way to have spacing at the front of the support pole 1 by a given distance.

The RRH 30 may be installed in the spacing between the antenna module 20 and the support pole 1. Therefore, it is preferred that a thickness of the front and back of the RRH 30 is designed not to exceed front and back spacing between the antenna module 20 and the support pole 1, which is formed by maximum spacing.

The RRH 30 is equipped with a heat-dissipation element that dissipates heat when an internal component operates, and requires heat-dissipation means toward the outside. Accordingly, multiple backward heat-dissipation pins 32 that dissipate internal heat backward may be provided at the back of the RRH main body 31. Multiple forward heat-dissipation pins 33 that dissipate internal heat forward may be provided at the front of the RRH main body 31. The backward heat-dissipation pins 32 and forward heat-dissipation pins 33 of the RRH 30 may smoothly dissipate internal heat to the outside using the spacing between the antenna module 20 and the support pole 1.

Two or more RRHs 30 may be coupled to the back of one antenna module 20 up and down in multiple stages. In an embodiment of the present disclosure, however, an example in which one RRH 30 is installed at the back of one antenna module 20 is described for convenience of description.

The RRH 30 may be disposed to face the back of the antenna module 20 in a way to maintain a given interval. That is, the RRH 30 and the antenna module 20 may be disposed to face each other in a face-to-face way.

As will be described later, one or more antenna-side connection parts 25 for an electrical signal connection with the RRH 30 may be provided at the back of the antenna module 20. An adapter 100 that mediates an electrical signal connection between the antenna module 20 and the RRH 30 may be further provided under the RRH 30. The antenna module 20 and the RRH 30 may be provided to be directly coupled by the adapter 100 and to have a connection structure also playing a role as a fixing function.

That is, at least one antenna-side connection part 25 may be provided at the back of the antenna module 20 to enable an electrical signal connection with the RRH 30 through the medium of an integrated connection part 120 among elements of the adapter 100 to be described later. The number of antenna-side connection parts 25 is provided in accordance with the number of integrated connection parts 120. If the integrated connection part 120 is provided in a protruded form, the antenna-side connection part 25 may be provided in the form of a groove connected in a male and female coupling form.

The antenna module 20 may be an antenna capable of fourth-generation (4G) mobile communication or pre-5G or fifth-generation (5G) mobile communication services. As illustrated in FIGS. 1 to 3, the antenna module 20 is provided in a form that is long up and down. The front and side of the antenna module 20 among multiple external surfaces thereof may be shielded by separate cover members (reference numeral not indicated), respectively.

A hinge fixing part 26 for coupling with the RRH 30 may be provided at the back of the antenna module 20. The hinge fixing part 26 may be provided in the form of a hinge hole that is left and right penetrated in an intermediate portion of the antenna module 20 on the back side thereof. An open slit 27 having the hinge hole side opened downward may be formed in the hinge fixing part 26.

Furthermore, a hinge coupling pole 35 inserted into the hinge hole of the hinge fixing part 26 provided in the antenna module 20 may be provided at the top of the RRH 30. The hinge coupling pole 35 may be fixed through the medium of a hinge installation bracket fixed to the top of the RRH 30.

Multiple bearing balls 28 for minimizing a friction force with the hinge coupling pole 35 may be disposed on the inside of the hinge hole of the hinge fixing part 26. That is, the multiple bearing balls 28 function to guide the rotation of the outer circumference surface of the hinge coupling pole 35 that is rotated while forming the outer circumference of the hinge hole.

As illustrated in FIG. 3, the RRH 30 may be hinged and fastened by an operation of the hinge coupling pole 35 horizontally moving from the left or the right and being inserted into the hinge fixing part 26. When the hinge coupling pole 35 of the RRH 30 is fully hinged and fastened to the hinge fixing part 26, outward breakaway of the hinge coupling pole 35 can be prevented by fixing caps 29*a* and 29*b* provided at left and right ends of the hinge fixing part 26, respectively.

That is, as illustrated in FIGS. 1 to 3, an embodiment of the antenna apparatus for a base station according to the present disclosure can improve work efficiency upon maintenance of the RRH 30 itself because the RRH 30 is conveniently hinged, fastened and coupled by inserting the hinge coupling pole 35 into the hinge fixing part 26 in the state in which the antenna module 20 has been coupled to the support pole 1 without a need to separate the antenna module 20 from the support pole 1 in order to install the RRH 30 at a portion corresponding to the spacing.

The top of the RRH 30 is hinged and fastened to the back of the antenna module 20 through the hinge coupling pole 35. Accordingly, the bottom of the RRH 30 can be hinged and rotated backward at a given angle using the hinge fixing part 26 as the center of rotation.

Multiple ports 39 provided for an electrical signal connection with the antenna module 20 may be provided at the bottom of the RRH 30. Hereinafter, in an embodiment of the antenna apparatus for a base station according to the present disclosure, description is given on the premise that four ports 39 are provided at the bottom of the RRH 30 and that four branch connection parts 130 of the adapter to be described later, which are connected to the respective ports 39, are also provided.

Figure 4:
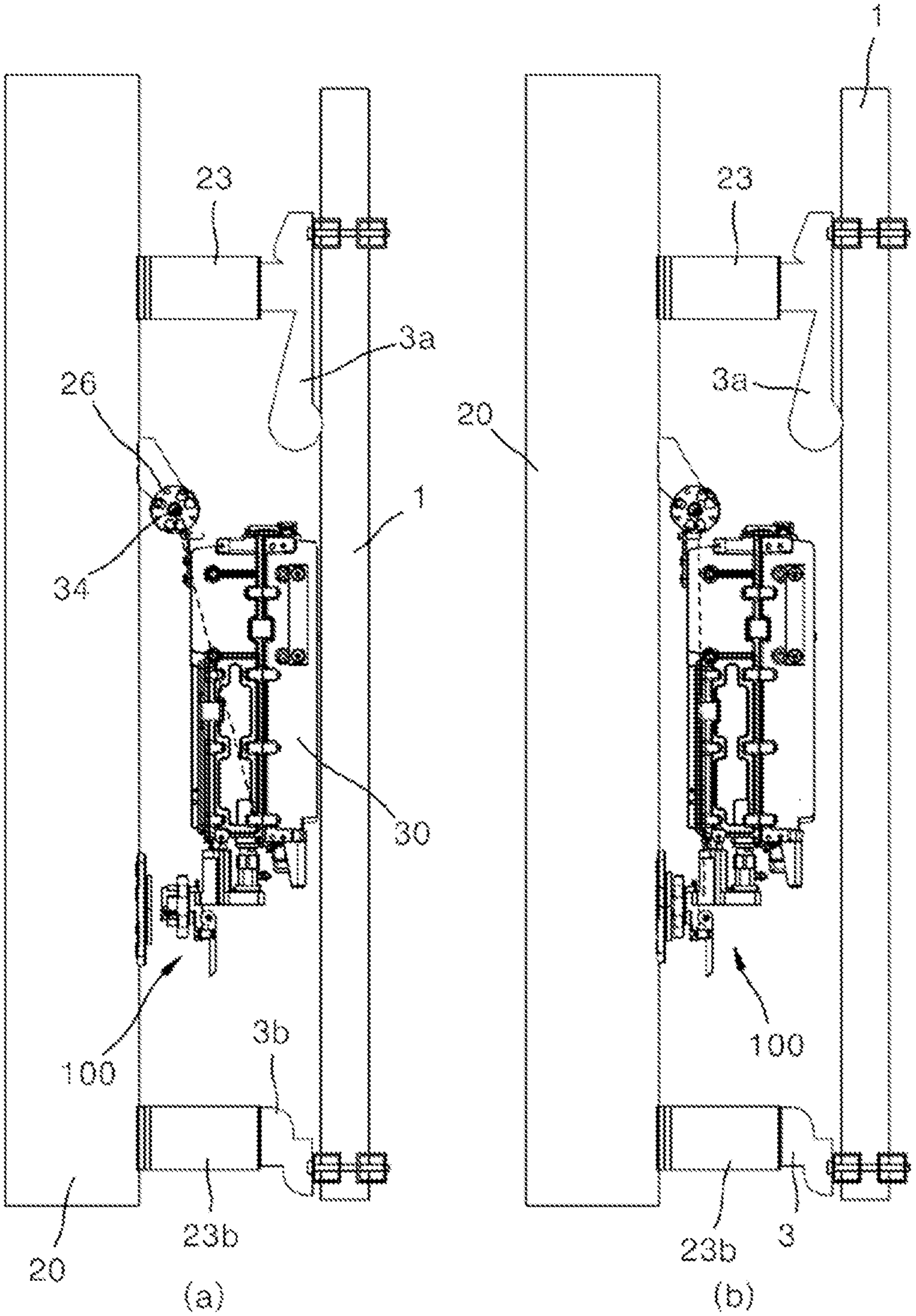
FIG. 4 is a side view illustrating a coupling process using the antenna apparatus for a base station and an adapter therefor according to the first embodiment of the present disclosure.
Figure 5:
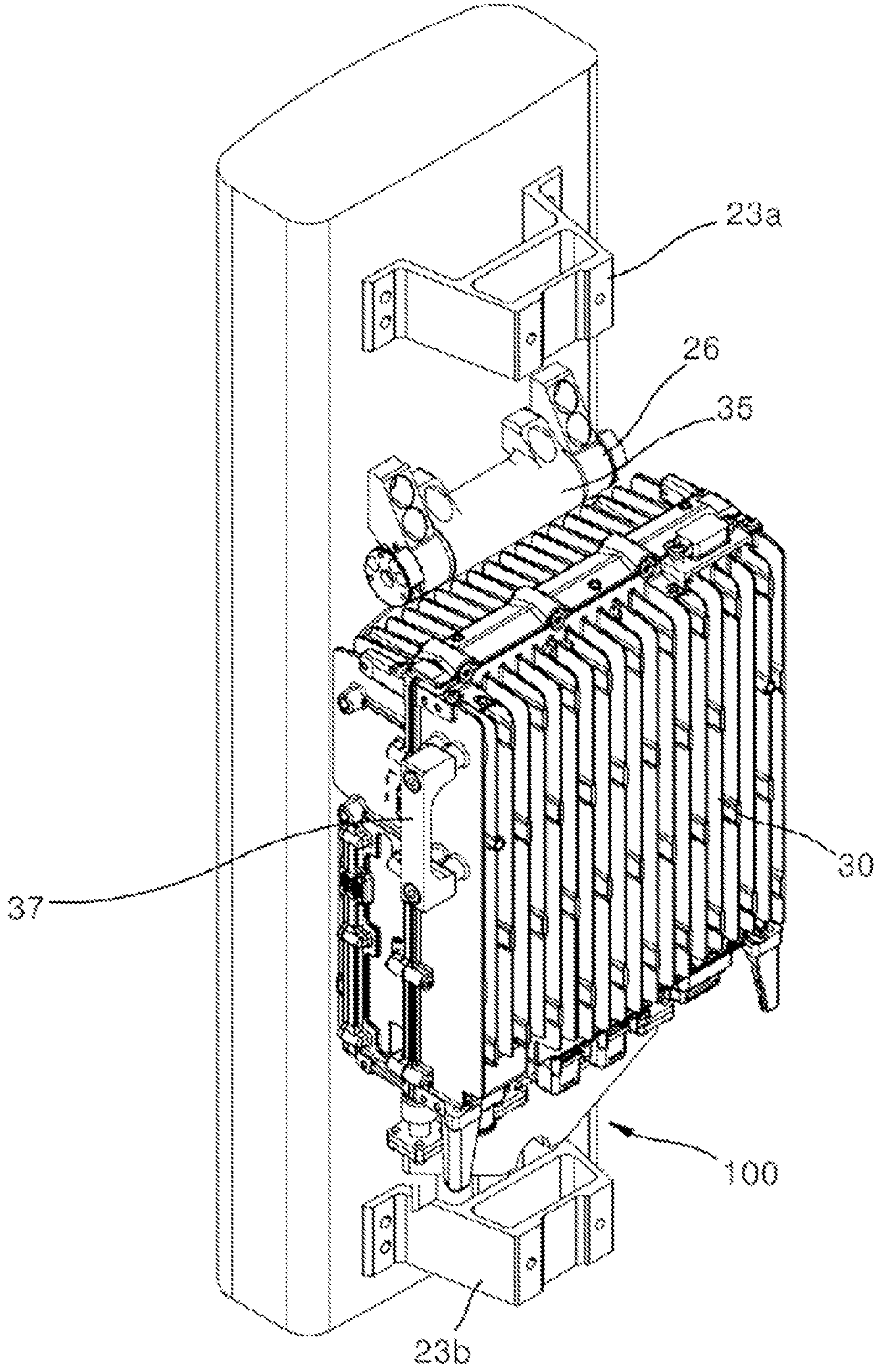
FIG. 5 is a rear perspective view illustrating a form in which an antenna module and an RRH among elements of the antenna apparatus for a base station according to the first embodiment of the present disclosure are coupled.
Figure 6:
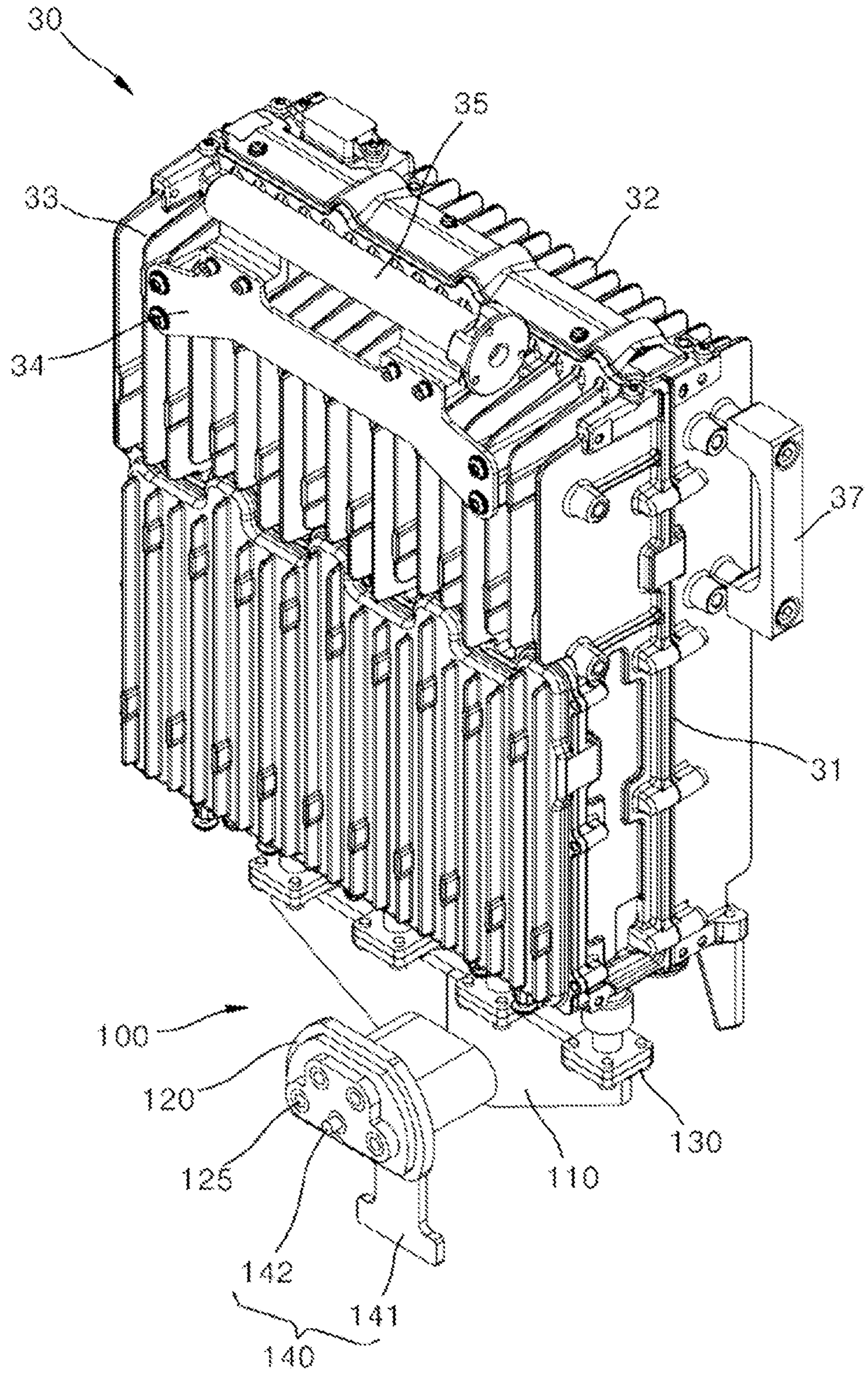
FIG. 6 is a perspective view illustrating the state in which the adapter for the antenna apparatus for a base station according to the first embodiment of the present disclosure has been coupled to the RRH.
Figure 7:
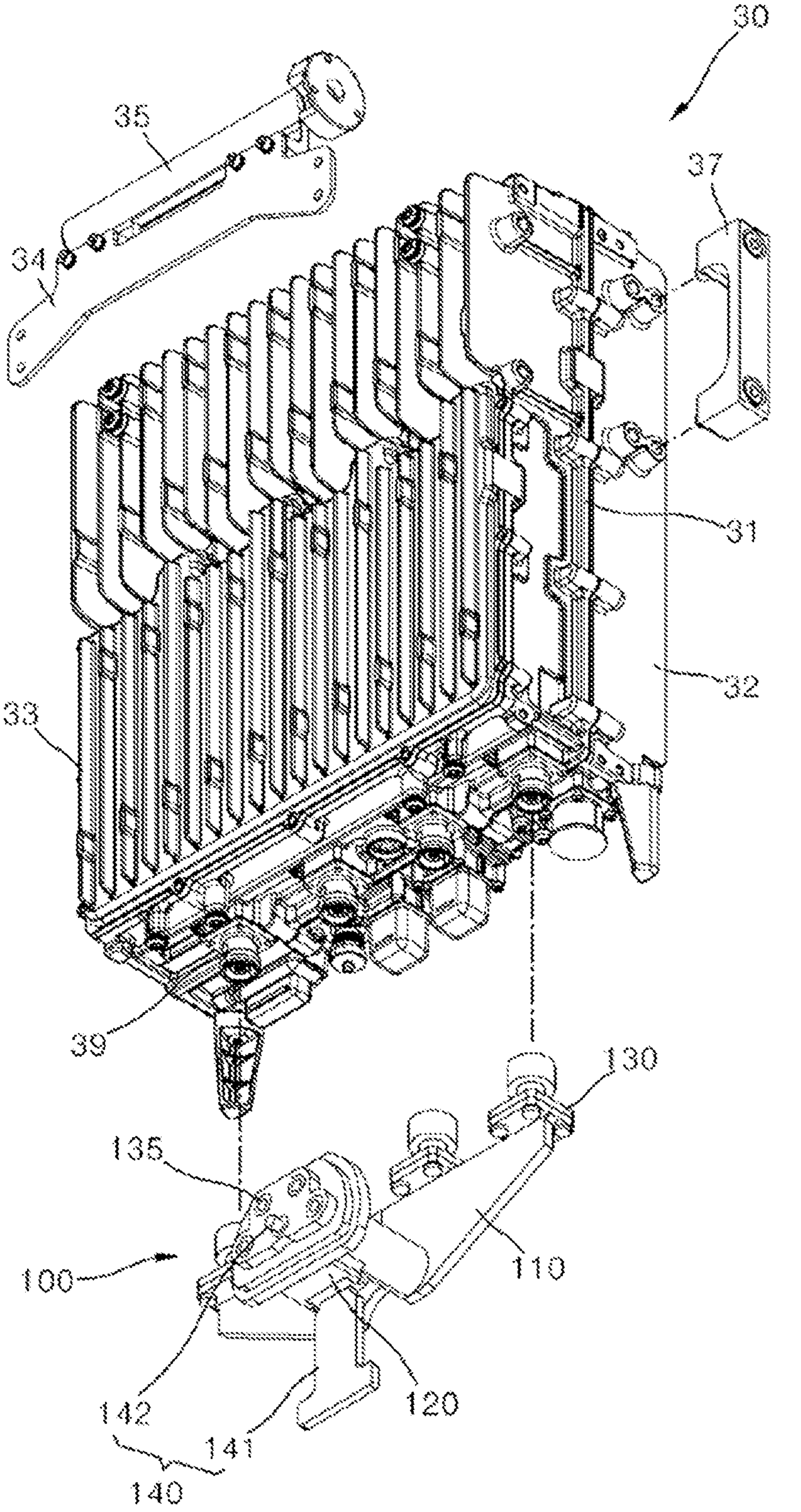
FIG. 7 is an exploded perspective view of FIG. 6.
Figure 8:
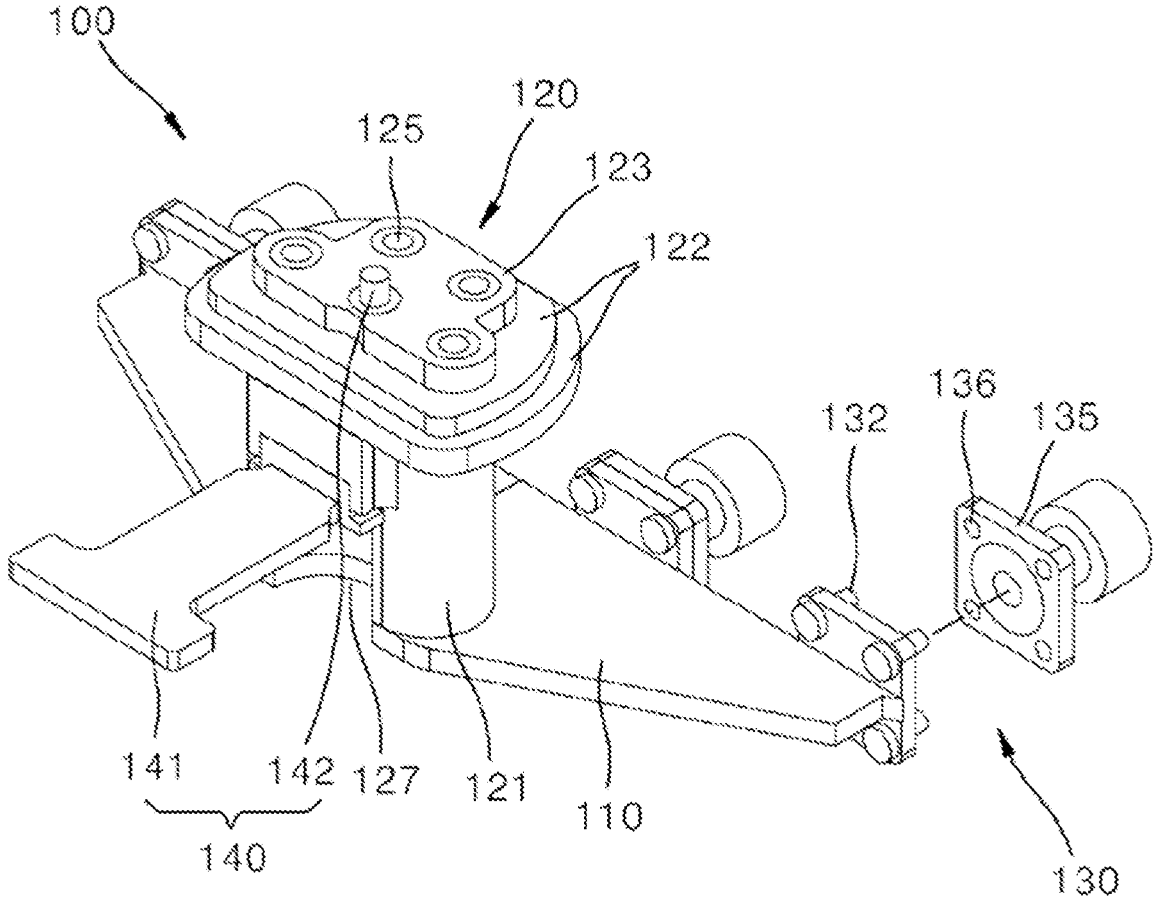
FIG. 8 is a perspective view and 일부 exploded perspective view illustrating the adapter for the antenna apparatus for a base station according to the first embodiment of the present disclosure.

FIG. 4 is a side view illustrating a coupling process using the antenna apparatus for a base station and the adapter therefor according to the first embodiment of the present disclosure. FIG. 5 is a rear perspective view illustrating a form in which the antenna module and the RRH among elements of the antenna apparatus for a base station according to the first embodiment of the present disclosure are coupled. FIG. 6 is a perspective view illustrating the state in which the adapter for the antenna apparatus for a base station according to the first embodiment of the present disclosure has been coupled to the RRH. FIG. 7 is an exploded perspective view of FIG. 6. FIG. 8 is a perspective view and some exploded perspective view illustrating the adapter for the antenna apparatus for a base station according to the first embodiment of the present disclosure.

An embodiment of the antenna apparatus for a base station according to the present disclosure may further include the adapter 100 that mediates electrical signal connection and disconnection between the antenna module 20 and the RRH 30.

Hereinafter, in order to distinguish between the adapter 100 referred in FIGS. 1 to 10 and an adapter 200 referred in FIGS. 11 to 14A to be described later, the former is defined as “the adapter 100 according to the first embodiment”, and the latter is defined as “the adapter 200 according to the second embodiment.”

As illustrated in FIGS. 4 to 8, the adapter 100 according to the first embodiment may include a mounting panel 110 vertically disposed lengthily left and right, the integrated connection part 120 provided at the side end part of the mounting panel 110 for an electrical signal connection with the antenna module 20, and the branch connection part 130 provided at the top of the mounting panel 110 for an electrical signal connection with the RRH 30.

As illustrated in FIGS. 4 and 5, the adapter 100 configured as above according to the first embodiment may function to electrically connect and mechanically fix the RRH 30 to the antenna module 20 by an operation of forward rotating the bottom of the RRH 30 around the hinge coupling pole 35 at the top of the RRH within the spacing in the state in which the branch connection part 130 at the top has been coupled to the RRH 30.

More specifically, the branch connection part 130 may include multiple connecting structures 135 provided at the top of the mounting panel 110 as a number corresponding to the number of ports 39 provided at the bottom of the RRH 30 and seated panels 131 provided so that the multiple connecting structures 135 are seated therein, respectively. At least two screw fastening holes 136 for screw fastening to the multiple seated panels 131 may be formed in the multiple connecting structures 135. Fastening screws 132 are fastened to the screw fastening holes 136 through the seated panel 131, thus being capable of firmly fixing the connecting structure 135 to the seated panel 131.

The connecting structure 135 connected to each port 39 of the RRH 30 may be seated and coupled to the top of the seated panel 131. The connecting structure 135 is an element that substantially mediates electrical signal connection and disconnection to and from the RRH 30. The connecting structure 135 is provided for each port 39 and functions to transmit and receive electrical signals for each port 39. In this case, the connecting structure 135 may include a DCC connector. However, the connecting structure 135 is not limited to the DCC connector, and any connection structure capable of an electrical signal connection with each port 39 of the RRH 30 may be adopted.

In the coupling of the adapter 100 according to the first embodiment with the RRH 30, the aforementioned electrical signal connection and mechanical connection may be simultaneously performed even without a separate fixing member through the firm coupling of the DCC connector with each port 39. If a desired fixing force is not obtained by only a connection force (or coupling force) between each port 39 and the DCC connector, a separate fixing member (not illustrated) may be provided to secure a firm mechanical connection force.

At least one integrated connection part 120 may be provided at the side end part of the mounting panel 110 in a way to protrude toward the back of the antenna module 20 so that the integrated connection part 120 is connected to the at least one antenna-side connection part 25 provided at the back of the antenna module 20.

Although not illustrated, the integrated connection part 120 may construct an independent signal line for transmission and reception within the mounting panel 110 through the medium of the connecting structure 135 provided as the DCC connector of the branch connection part 130 coupled to each port 39 of the RRH 30. Accordingly, the multiple connecting structures 125 connected to each signal line and capable of transmitting electricity to the antenna-side connection part 25 may be provided on an exposed surface of the integrated connection part 120. In this case, the multiple connecting structures 125 may be the same DCC connectors as those applied to the branch connection part 130. However, the connecting structure 125 is not limited to the DCC connector, and a PICW connection structure may be adopted.

In addition, it is preferred that the integrated connection part 120 is provided as the number of the least common multiple of the number of connecting structures 135 of the branch connection part 130. For example, if two connecting structures 135 of the branch connection part 130 are provided, the number of integrated connection parts 120 may be one, that is, the least common multiple of the connecting structure 135 of the branch connection part 130. If four connecting structures 135 of the branch connection part 130 are provided, the number of integrated connection parts 120 may be two, that is, the least common multiple of the connecting structure 135 of the branch connection part 130.

For reference, in the adapter 100 according to the first embodiment, the integrated connection part 120 may be defined to be provided as a singular number in a way to construct an independent signal line for all of the four connecting structures 135 provided in the branch connection part 130. As will be described later, in the adapter 200 according to the second embodiment, such that each of the integrated connection parts 120 constructs an independent signal line for every two of the four connecting structures 135 provided in the branch connection part 130.

In the adapter 100 according to the first embodiment, as illustrated in FIG. 8, the integrated connection part 120 may include a protruding block 121 elongated in a way to cross at right angles to the mounting panel 110 and elongated toward the antenna module 20 by a given length, an assembly short jaw 122 provided at the front end part of the protruding block 121 and closely caught in an edge portion of the antenna-side connection part 25, and a connection short jaw 123 provided on the outside of the assembly short jaw 122 and having the multiple connecting structures 125 inserted therein in an embedded manner.

In addition, the adapter 100 according to the first embodiment may further include a locking part 140 provided in the integrated connection part 120 and for preventing the separation of the adapter 100 from the antenna module 20. The locking part 140 functions to prevent an electrical signal connection, constructed with the antenna-side connection part 25, from being randomly disconnected through the integrated connection part 120 due to vibration attributable to an external environment, such as the wind.

As illustrated in FIG. 8, the locking part 140 may include a locking lever 141 having a front end part rotatably hinged to part of the protruding block 121 of the integrated connection part 120 and a locking rod 142 provided to move in a straight line front and back in conjunction with a rotation operation of the locking lever 141 and having a front end part inserted into and engaged with the antenna-side connection part 25 of the antenna module 20.

After the integrated connection part 120 of the adapter is connected to the antenna-side connection part 25 by rotating the bottom of the RRH 30 around the hinge coupling pole 35 and an electrical signal connection is completed, when the bottom of the RRH 30 is forward rotated around a hinge coupling portion at the top of the locking lever 141 that is horizontally provided front and back, the locking rod 142 protrudes into the antenna-side connection part 25 and caught therein. Accordingly, the integrated connection part 120 of the adapter 100 can be prevented from being randomly attached to or detached from the antenna-side connection part 25.

At least one rod sealing **140*a* and 140*b* for preventing moisture from flowing into a gap between the outer circumference surface of the locking rod 142 and the antenna-side connection part 25 may be disposed on the outer circumference surface of the locking rod 142**.

A lever accommodation groove 127 for accommodating and holding the locking lever 141 if the locking lever 141 is horizontally provided front and back may be upward depressed under the protruding block 121 of the integrated connection part 120. Before the integrated connection part 120 is connected to the antenna-side connection part 25, the locking lever 141 is accommodated and held in the lever accommodation groove 127. When a connection with the antenna-side connection part 25 of the integrated connection part 120 is completed, the locking lever 141 is rotated from the lever accommodation groove 127 and fixed in order to firmly fix the connection.

Figure 9:
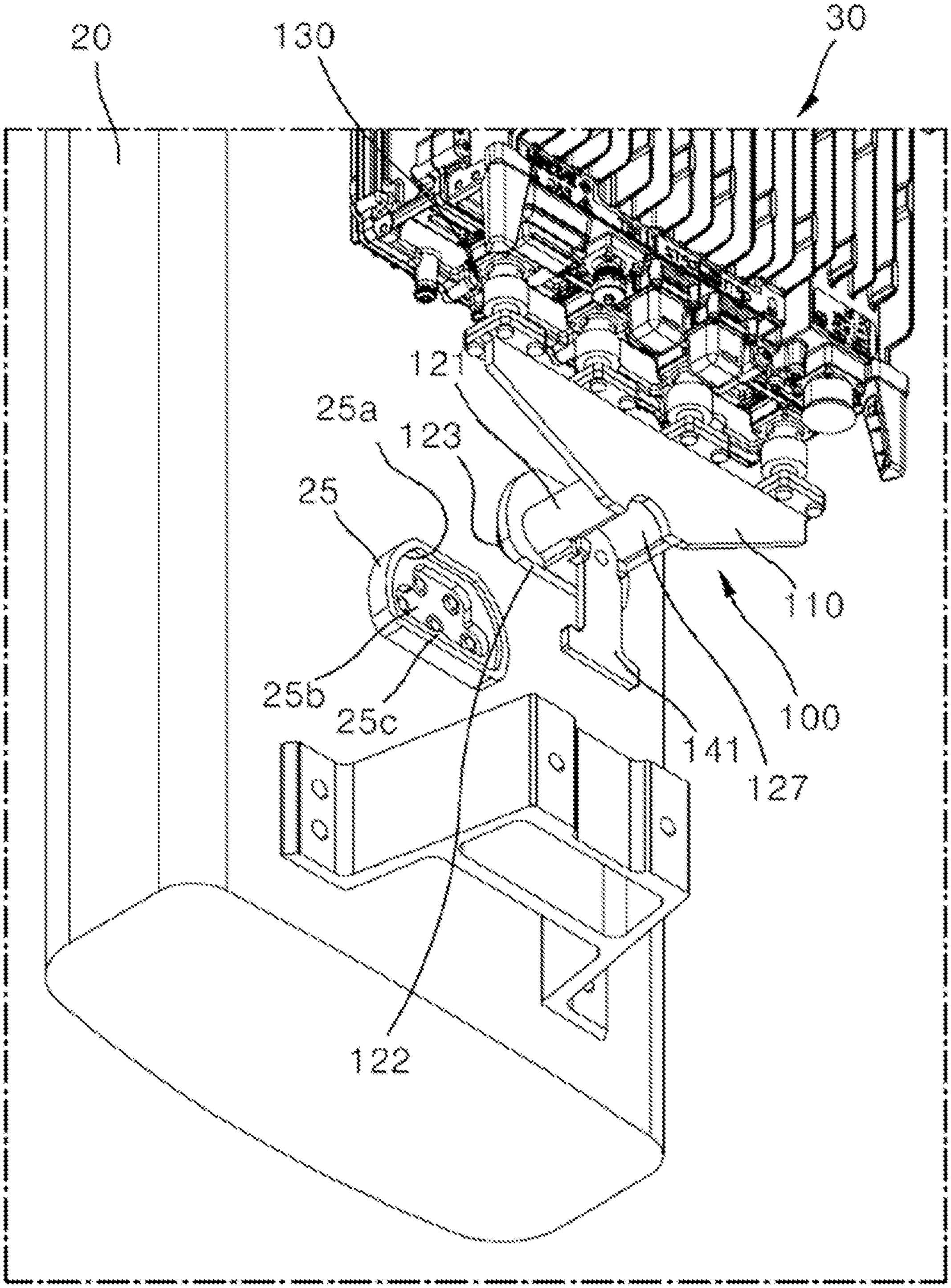
FIG. 9 is a perspective view illustrating a form in which the adapter is coupled to the antenna module, among elements of the antenna apparatus for a base station according to the first embodiment of the present disclosure.
Figure 10:
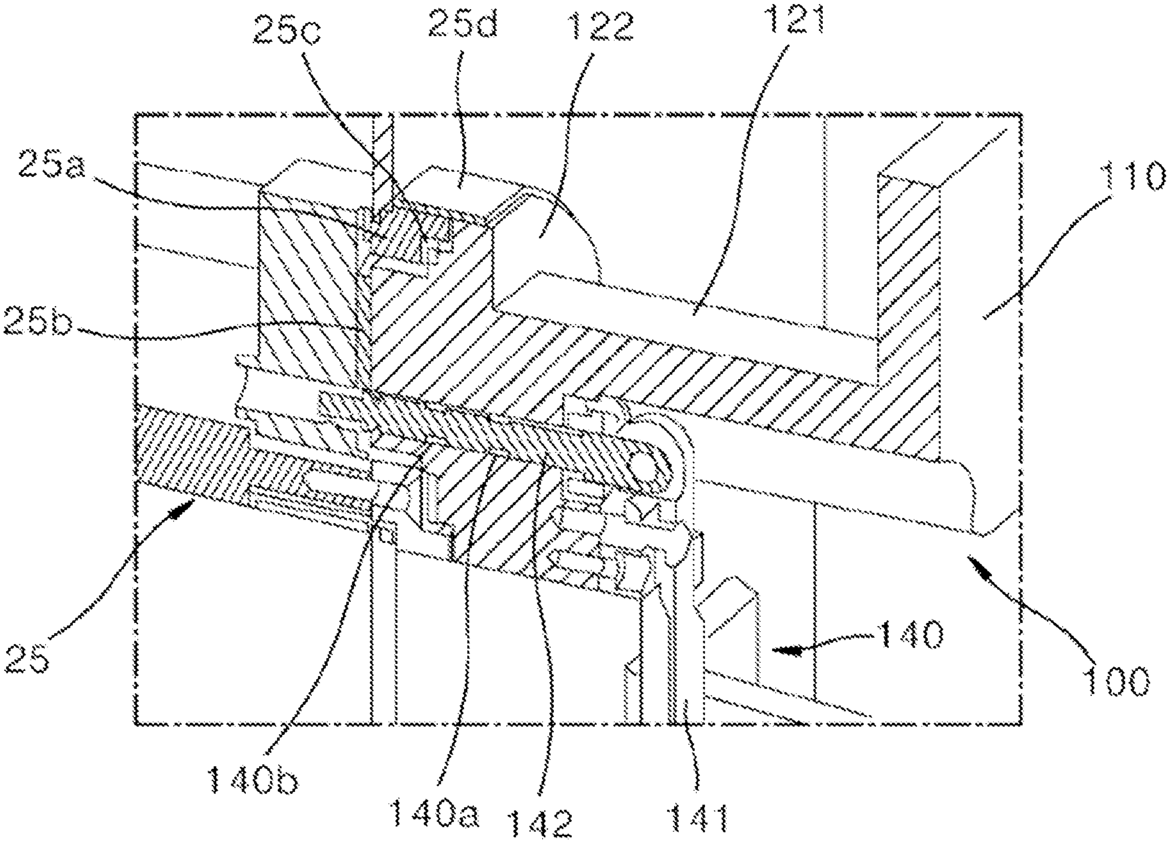
FIG. 10 is a cross-sectional view of FIG. 9.

FIG. 9 is a perspective view illustrating a form in which the adapter is coupled to the antenna module, among elements of the antenna apparatus for a base station according to the first embodiment of the present disclosure, and FIG. 10 is a cross-sectional view of FIG. 9.

As illustrated in FIG. 9, the antenna-side connection part 25 may be provided at the back of the antenna module 20 in a way to form an electrical signal connection with the integrated connection part 120 among elements of the adapter 100 according to the first embodiment.

As illustrated in FIG. 9, the antenna-side connection part 25 may include an edge rib **25*a* provided in the form of a groove depressed into the antenna module 20 at a given depth to form an edge and the inside wall of an internal groove in which the assembly short jaw 122 of the integrated connection part 120 is accommodated, a first sealing pad 25*b* disposed within the groove part of the antenna-side connection part 25 to seal the outside of the connection short jaw 123 of the integrated connection part 120 and the inside of the antenna-side connection part 25, and a second sealing pad 25*c* disposed on the inside of the edge rib 25*a* to seal the assembly short jaw 122 of the integrated connection part 120 and the edge rib 25*a***.

Meanwhile, after the integrated connection part 120 is connected to the antenna-side connection part 25, as illustrated in FIG. 10, an external sealing **25*d* wound to include the outer circumference surface of the assembly short jaw 122 and the outer circumference of the edge rib 25*a* of the antenna-side connection part 25** may be taped.

A corresponding connector (reference numeral thereof not indicated) may be provided on the inside of the antenna-side connection part 25 in a way to form an electrical signal connection with each connecting structure 125 of the integrated connection part 120.

As described above, the adapter 100 according to the first embodiment enables a connection through an independent signal line because the four connecting structures 125 provided in the branch connection part 130, comprised of the four connecting structures 135 coupled to the four ports 39 of the RRH 30, respectively, and a single number of the integrated connection part 120 are connected to corresponding connectors of the single antenna-side connection part 25 provided in the antenna module 20.

Figure 11:
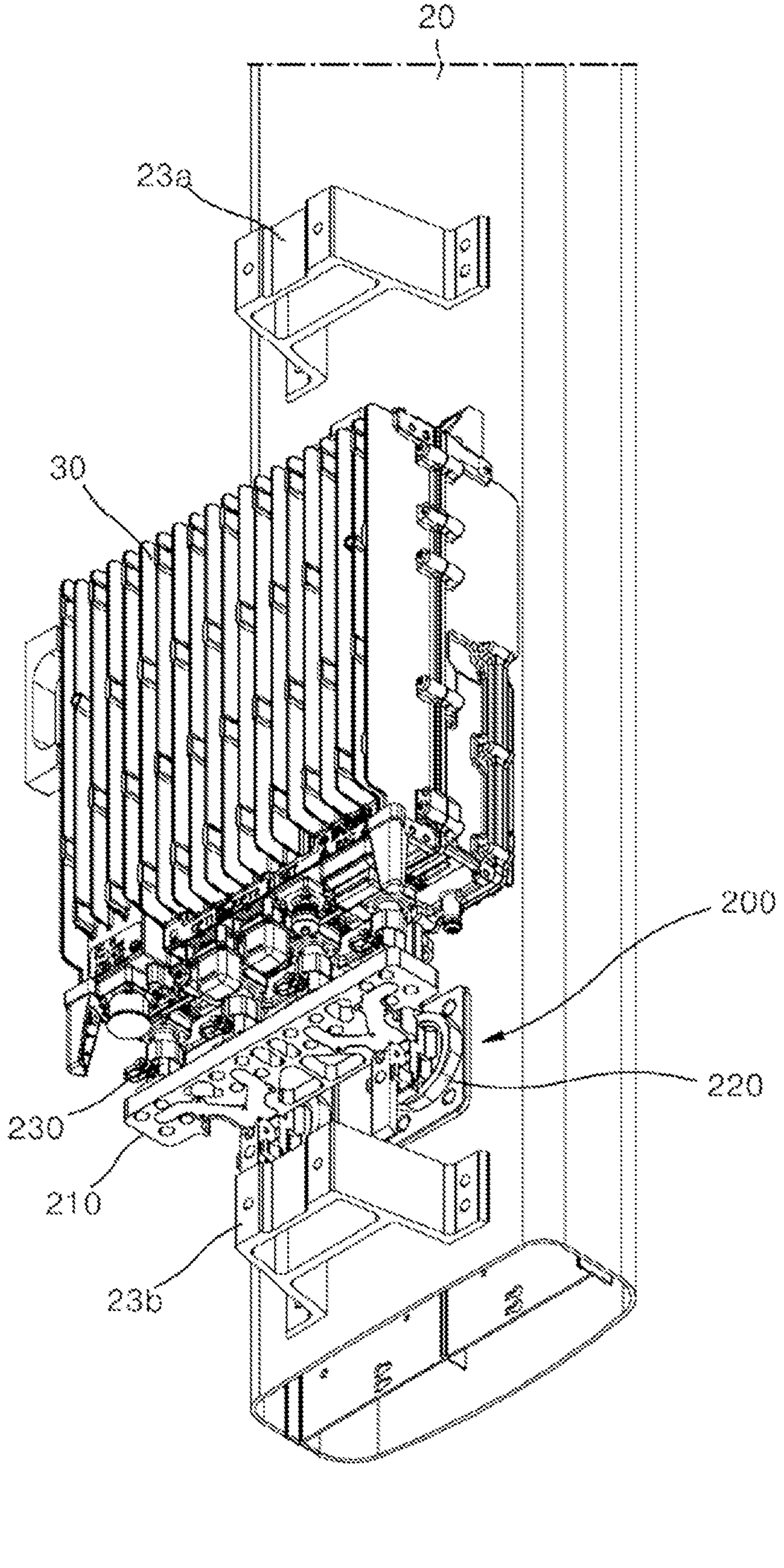
FIG. 11 is a rear perspective view illustrating a second embodiment of an antenna apparatus for a base station according to the present disclosure.
Figure 12A:
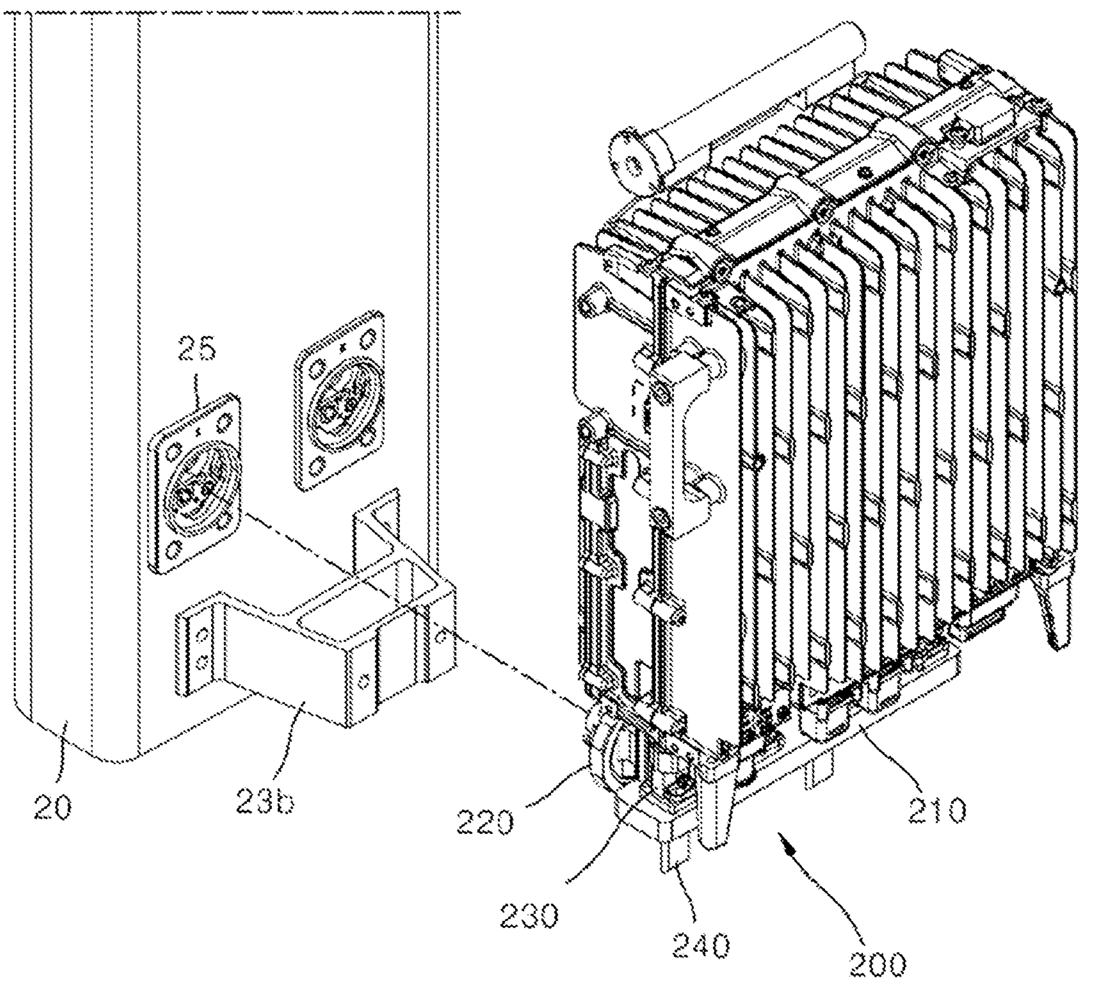
FIGS. 12A and 12B are a front-side exploded perspective view and rear-side exploded perspective view illustrating a form in which an adapter is coupled to an antenna module among elements of FIG. 11.
Figure 12B:
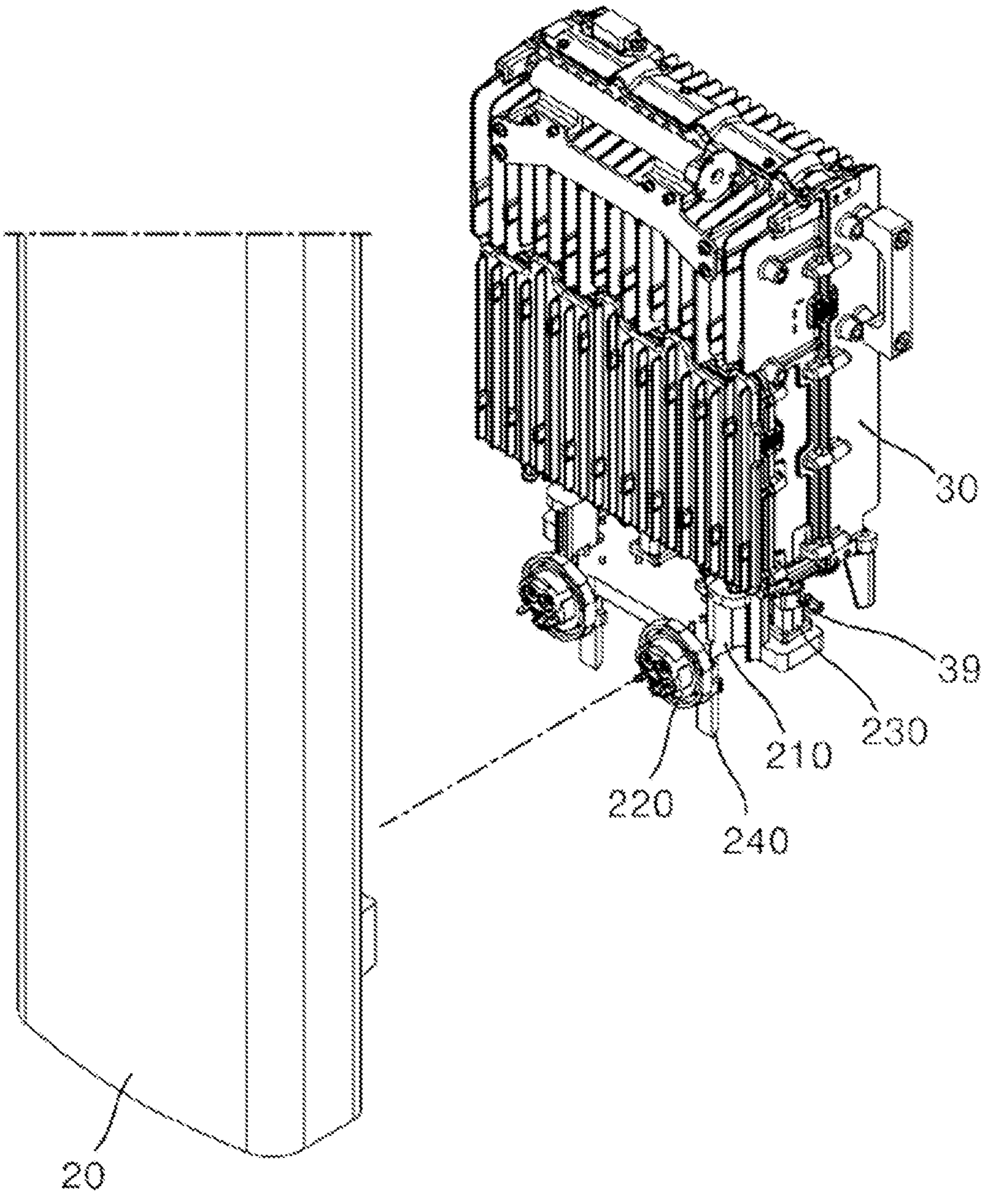
Figure 13:
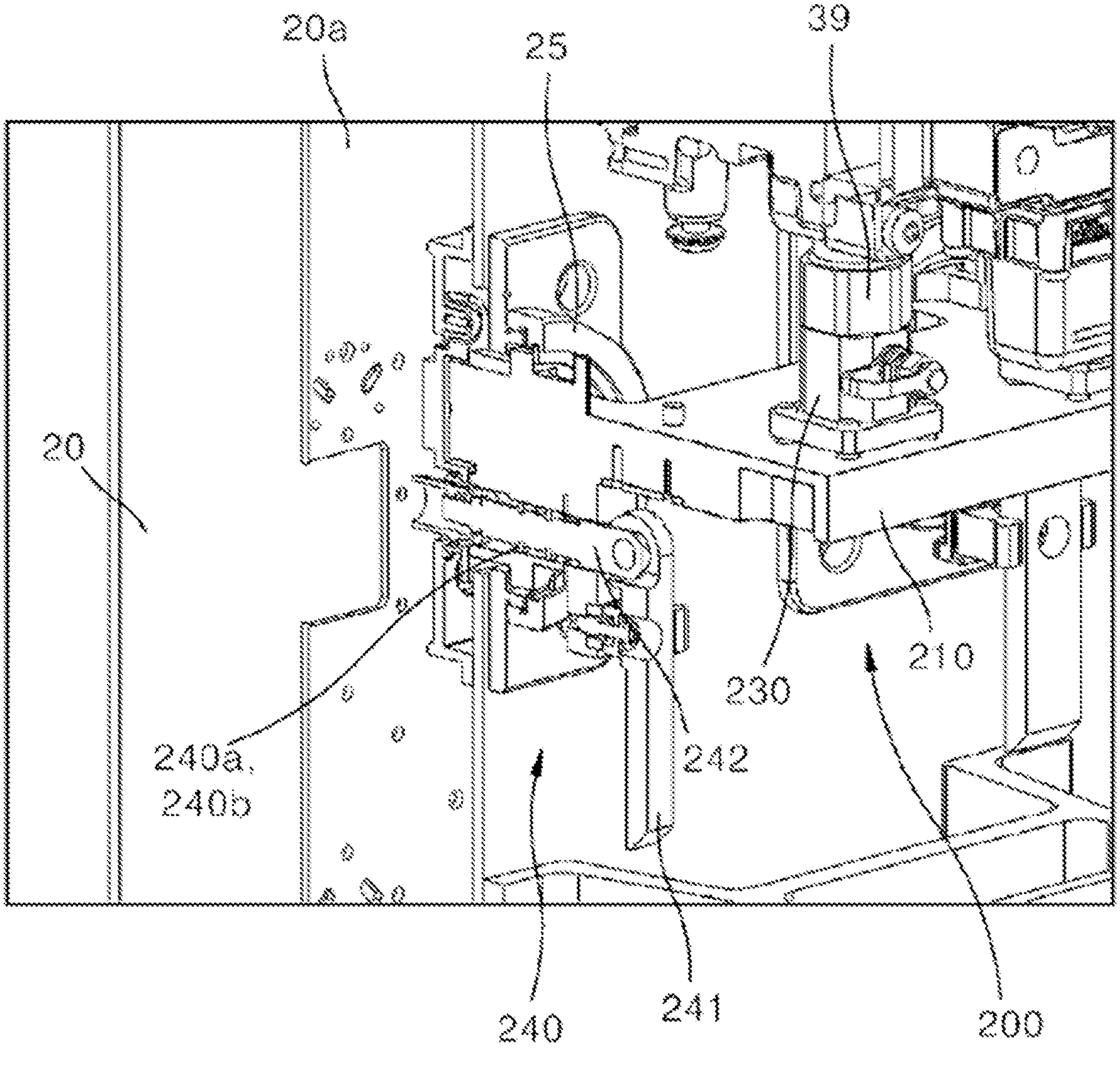
FIG. 13 is a cutaway perspective view of FIG. 11.
Figure 14A:
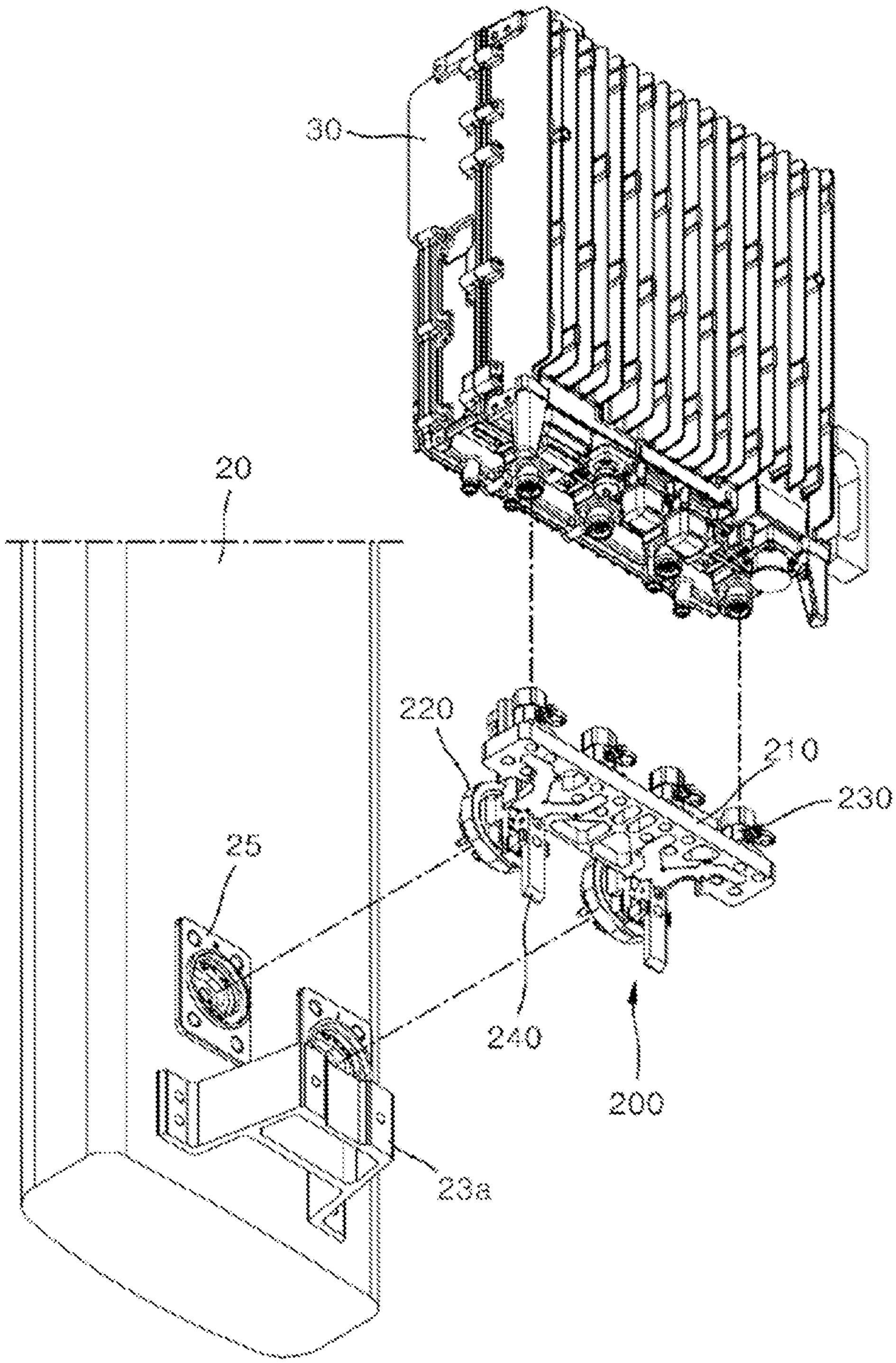
FIGS. 14A and 14B are a front-side exploded perspective view and rear-side exploded perspective view of an antenna module, an RRH, and an adapter that mediates the connection of the antenna module and the RRH among elements of FIG. 11.
Figure 14B:
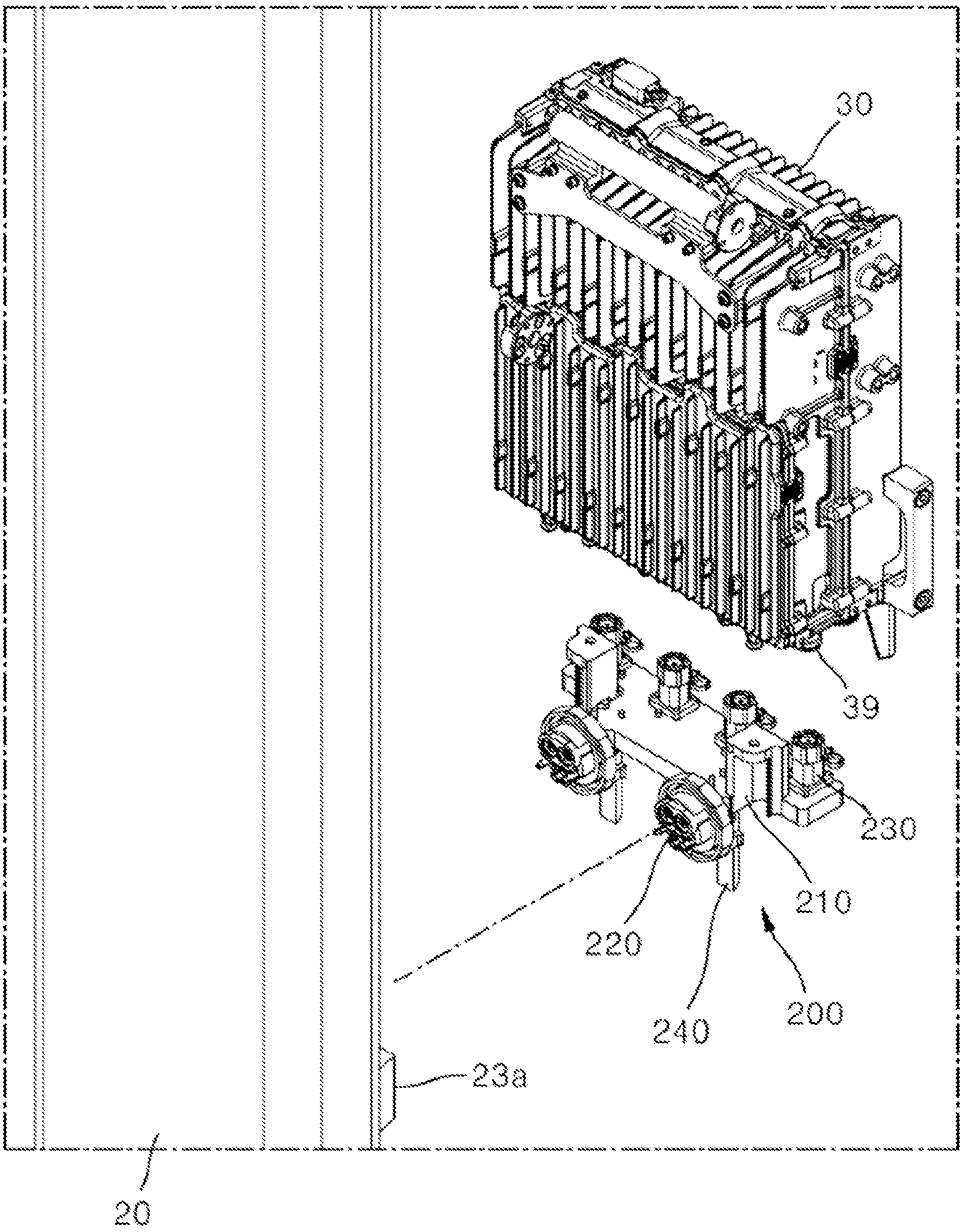

FIG. 11 is a rear perspective view illustrating a second embodiment of an antenna apparatus for a base station according to the present disclosure. FIGS. 12A and 12B are a front-side exploded perspective view and rear-side exploded perspective view illustrating a form in which an adapter is coupled to an antenna module among elements of FIG. 11. FIG. 13 is a cutaway perspective view of FIG. 11. FIGS. 14A and 14B are a front-side exploded perspective view and rear-side exploded perspective view of an antenna module, an RRH, and an adapter that mediates the connection of the antenna module and the RRH among elements of FIG. 11.

As illustrated in FIGS. 11 to 14B, the antenna apparatus for a base station according to the second embodiment of the present disclosure has the same electrical signal connection process as the antenna apparatus for a base station according to the first embodiment. In this case, the reason why the antenna apparatus for a base station according to the second embodiment and the first embodiment are distinguished comes from a difference in the number of integrated connection parts 220, the number of antenna-side connection parts 25 of the antenna module to which the integrated connection part 220 is coupled, and a detailed external appearance thereof among elements of the adapter 200 applied to the second embodiment.

Accordingly, hereinafter, a difference between the adapter 100 according to the first embodiment and the adapter 200 according to the second embodiment is chiefly described.

The mounting panel 210 of the second embodiment which is horizontally disposed left and right is different from the mounting panel 110 of the first embodiment which is vertically disposed left and right.

In addition, unlike in the first embodiment in which the number of integrated connection parts 120 is a singular number, in the second embodiment, two integrated connection parts 220 may be provided to be responsible for every two signal lines, that is, the least common multiple of four connecting structures 235 of a branch connection part 230.

As described above, in the case of the adapter 200 according to the second embodiment, there is an advantage in that a stable connection force can be maintained compared to the adapter 100 according to the first embodiment because electrical signal connections and mechanical connections are performed at two places, that is, the two integrated connection parts 220 and two antenna-side connection parts 25 corresponding thereto.

In addition, an internal connection structure may be provided as a structure simply assembled in view of its external appearance. In contrast, in the first embodiment, in an external appearance of the integrated connection part 120 and the antenna-side connection part 25 of the antenna module 20, the integrated connection part 120 of the first embodiment has the assembly short jaw 122 and the connection short jaw 123 shortly stepped and the antenna-side connection parts 25 of the first embodiment are provided to accommodate the assembly short jaw 122 and connection short jaw 123 of the integrated connection part 120, respectively.

In addition, like the adapter 100 according to the first embodiment, the adapter 200 according to the second embodiment includes a locking part 240 and may be firmly connected to the antenna-side connection part 25 through the locking part 240.

As described above, embodiments of the antenna apparatus for a base station and the adapter therefor according to the present disclosure have been described in detail with reference to the accompanying drawings. However, an embodiment of the present disclosure is not essentially restricted by the aforementioned embodiments, and various modifications and an implementation within an equivalent range may be naturally possible by a person with ordinary skill in the art to which the present disclosure pertains. Accordingly, a true scope of rights of the present disclosure may be said to be determined by the following claims.

INDUSTRIAL APPLICABILITY

The present disclosure provides the antenna apparatus for a base station and the adapter therefor, which minimize an installation time and installation cost for the antenna apparatus for a base station and which are also convenient for maintenance by minimizing and sharing parts used to install an antenna module and an RRH in a support pole.

What is claimed is:

1. An antenna apparatus, comprising:

an antenna module configured to be installed spaced apart from a support pole, wherein the antenna module comprises a hinge fixing part provided on its back surface;

a remote radio head (RRH) configured to be installed on a back surface of the antenna module in a space between the antenna module and the support pole, wherein the RRH comprises a hinge coupling pole on its top; and an adapter configured to mediate electrical signal connection and disconnection of the antenna module and the RRH, wherein the RRH is configured to be hinged and fastened by the hinge coupling pole which is configured to slidably move horizontally to be inserted into the hinge fixing part.

2. The antenna apparatus of claim 1, wherein the antenna module further comprises at least one fixing cap provided on at least one end of the hinge fixing part such that the hinge coupling pole is secured once the hinge coupling pole is inserted into the hinge fixing part.

3. The antenna apparatus of claim 1, wherein the adapter comprises:

an integrated connection part provided at a side end part of the adapter so as to be connected to the antenna module, and one or more branch connection parts provided at a top of the adapter so as to be connected to the RRH, wherein the integrated connection part is further equipped with a locking part for preventing separation from the antenna module.

4. The antenna apparatus of claim 3, wherein:

the one or more branch connection parts are provided as a number corresponding to a number of ports provided in the RRH, and the integrated connection part is provided as a least common multiple of the number of branch connection parts.

5. The antenna apparatus of claim 3, wherein:

the branch connection parts and the integrated connection part comprise connecting structures, and the connecting structures comprise DCC connectors.

6. The antenna apparatus of claim 3, wherein the locking part comprises:

a locking lever provided at the side end part of the adapter so as to be hinged and rotated; and a locking rod provided to move in a straight line in conjunction with the locking lever, wherein a front end part of the locking rod is inserted and caught in an antenna-side connection part side of the antenna module.

7. The antenna apparatus of claim 6, wherein at least one rod sealing for waterproof purposes is disposed on an outer circumference surface of the locking rod.

8. The antenna apparatus of claim 3, wherein a bottom of the RRH is rotated around the hinge coupling pole in a state in which the hinge coupling pole is inserted and fastened to the hinge fixing part.

9. An antenna apparatus for a base station, comprising:

an antenna module installed in a way to have spacing at a front of a support pole by a given distance;

a remote radio head (RRH) installed on a back surface of the antenna module in a way to be located in the spacing, wherein any one of a top and bottom of the RRH is hinged and coupled to the back surface of the antenna module; and an adapter configured to mediate the electrical signal connection and disconnection of the antenna module and the RRH.

10. The antenna apparatus of claim 9, wherein the antenna module further comprises a hinge fixing part provided on its back surface and at least one fixing cap provided on at least one end of the hinge fixing part such that the hinge coupling pole is secured once the hinge coupling pole is inserted into the hinge fixing part.

11. The antenna apparatus of claim 9, wherein the adapter comprises:

an integrated connection part provided at a side end part of the adapter so as to be connected to the antenna module, and one or more branch connection parts provided at a top of the adapter so as to be connected to the RRH, wherein the integrated connection part is further equipped with a locking part for preventing separation from the antenna module.

12. The antenna apparatus of claim 11, wherein:

the one or more branch connection parts are provided as a number corresponding to a number of ports provided in the RRH, and the integrated connection part is provided as a least common multiple of the number of branch connection parts.

13. The antenna apparatus of claim 11, wherein:

the branch connection parts and the integrated connection part comprise connecting structures, and the connecting structures comprise DCC connectors.

14. The antenna apparatus of claim 11, wherein the locking part comprises:

a locking lever provided at the side end part of the adapter so as to be hinged and rotated; and a locking rod provided to move in a straight line in conjunction with the locking lever, wherein a front end part of the locking rod is inserted and caught in an antenna-side connection part side of the antenna module.

15. The antenna apparatus of claim 14, wherein at least one rod sealing for waterproof purposes is disposed on an outer circumference surface of the locking rod.

16. An adapter for an antenna apparatus, comprising:

an integrated connection part provided to be connected to an antenna module which is configured to be installed spaced apart from a support pole, wherein the antenna module comprises a hinge fixing part provided on its back surface;

one or more branch connection parts provided to be connected to a remote radio head (RRH) which is configured to be installed on a back surface of the antenna module in a space between the antenna module and the support pole, wherein the RRH comprises a hinge coupling pole on its top; and a locking part configured to prevent separation from the antenna module.

17. The adapter of claim 16, wherein the antenna module further comprises a hinge fixing part provided on its back surface and at least one fixing cap provided on at least one end of the hinge fixing part such that the hinge coupling pole is secured once the hinge coupling pole is inserted into the hinge fixing part.

18. The adapter of claim 16, wherein:

the one or more branch connection parts are provided as a number corresponding to a number of ports provided in the RRH, and the integrated connection part is provided as a least common multiple of the number of branch connection parts.

19. The adapter of claim 18, wherein:

the branch connection parts and the integrated connection part comprise connecting structures, and the connecting structures comprise DCC connectors.

* * * * *